(12) United States Patent
St-Amand

(10) Patent No.: US 11,331,812 B2
(45) Date of Patent: May 17, 2022

(54) ROBOTIC MANIPULATION OF FABRIC PIECES USING A DROPPING-ROLLER-TYPE PICKER

(71) Applicant: Michel St-Amand, Saint-Leonard (CA)

(72) Inventor: Michel St-Amand, Saint-Leonard (CA)

( * ) Notice: Subject to any disclaimer, the term of this patent is extended or adjusted under 35 U.S.C. 154(b) by 259 days.

(21) Appl. No.: 16/602,453

(22) Filed: Oct. 9, 2019

(65) Prior Publication Data

US 2021/0107168 A1   Apr. 15, 2021

(51) Int. Cl.
| | | |
|---|---|---|
| *B65H 5/14* | (2006.01) | |
| *B25J 15/02* | (2006.01) | |
| *B65G 59/02* | (2006.01) | |
| *B65H 3/38* | (2006.01) | |

(52) U.S. Cl.
CPC ............. *B25J 15/02* (2013.01); *B65G 59/02* (2013.01); *B65H 3/38* (2013.01); *B65H 5/14* (2013.01)

(58) Field of Classification Search
CPC .......... B65H 3/38; B65H 3/0623; B65H 5/14; B65H 5/08; B65H 2405/5832; B65H 2405/584; B65G 59/02; B25J 15/02; A41H 43/02; A41H 43/0228
See application file for complete search history.

(56) References Cited

U.S. PATENT DOCUMENTS

| | | |
|---|---|---|
| 3,253,824 A | 5/1966 | Southwell et al. |
| 3,353,821 A | 11/1967 | Smith et al. |
| 3,442,505 A | 5/1969 | Szentkuti |
| 3,547,432 A | 12/1970 | Herdeg |
| 3,583,695 A | 6/1971 | Sherwood |
| 3,940,125 A | 2/1976 | Morton |
| 4,019,729 A * | 4/1977 | Morton ..................... B65H 3/22 271/18.3 |
| 4,157,823 A | 6/1979 | Morton |
| 4,157,825 A | 6/1979 | Ellenberger et al. |
| RE30,084 E | 8/1979 | Morton |
| 4,176,832 A * | 12/1979 | Hughes ............... A41H 43/0278 271/10.01 |
| 4,198,041 A * | 4/1980 | Hughes ............... A41H 43/0278 271/22 |
| 4,299,179 A | 11/1981 | Helffer et al. |
| 4,425,858 A | 1/1984 | Hargett |

(Continued)

FOREIGN PATENT DOCUMENTS

| | | |
|---|---|---|
| GB | 2224865 | 5/1990 |
| GB | 2225652 | 6/1990 |

*Primary Examiner* — Thomas A Morrison
(74) *Attorney, Agent, or Firm* — Mario Theriault

(57) ABSTRACT

The method of transporting a piece of fabric material using a Morton™ picker comprises the steps of aligning a weight vector of the piece of fabric material being lifted, from the gap between the toothed wheel and the pressing foot of the picker and into a region between a tangent to the toothed wheel and a right angle to the pressing surface of the pressing foot; and lifting and transporting the piece of fabric material while maintaining the alignment of the weight vector in that region. In another aspect, there is provided robotic installation comprising a robotic arm and a Morton™ picker for manipulating pieces of fabric material. The robotic arm is configured for simultaneously rotating an axis of the picker and moving the picker along a hyperbolic trajectory, in a single complex motion without jitter, while maintaining the aforesaid alignment of the weight vector.

13 Claims, 5 Drawing Sheets

(56) References Cited

U.S. PATENT DOCUMENTS

| | | | |
|---|---|---|---|
| 4,482,144 | A | 11/1984 | Glassby |
| 5,040,778 | A | 8/1991 | Cole, Jr. |
| 5,082,267 | A | 1/1992 | Sanborn, III |
| 5,174,558 | A | 12/1992 | Sanborn, III |
| 5,180,155 | A * | 1/1993 | Asai .................... B65H 3/02 271/21 |
| 5,303,910 | A | 4/1994 | McGill et al. |
| 5,324,016 | A | 6/1994 | Beasock et al. |
| 5,535,997 | A | 7/1996 | Croyle et al. |
| 5,540,424 | A | 7/1996 | Trigg et al. |
| 5,806,845 | A | 9/1998 | Burt et al. |
| 8,060,998 | B2 | 11/2011 | Rey et al. |
| 8,868,231 | B2 | 10/2014 | Moore et al. |
| 2014/0052297 | A1 | 2/2014 | Mattern et al. |
| 2015/0098787 | A1 | 4/2015 | Ou et al. |
| 2021/0107168 | A1 * | 4/2021 | St-Amand ................ B65H 5/14 |

* cited by examiner

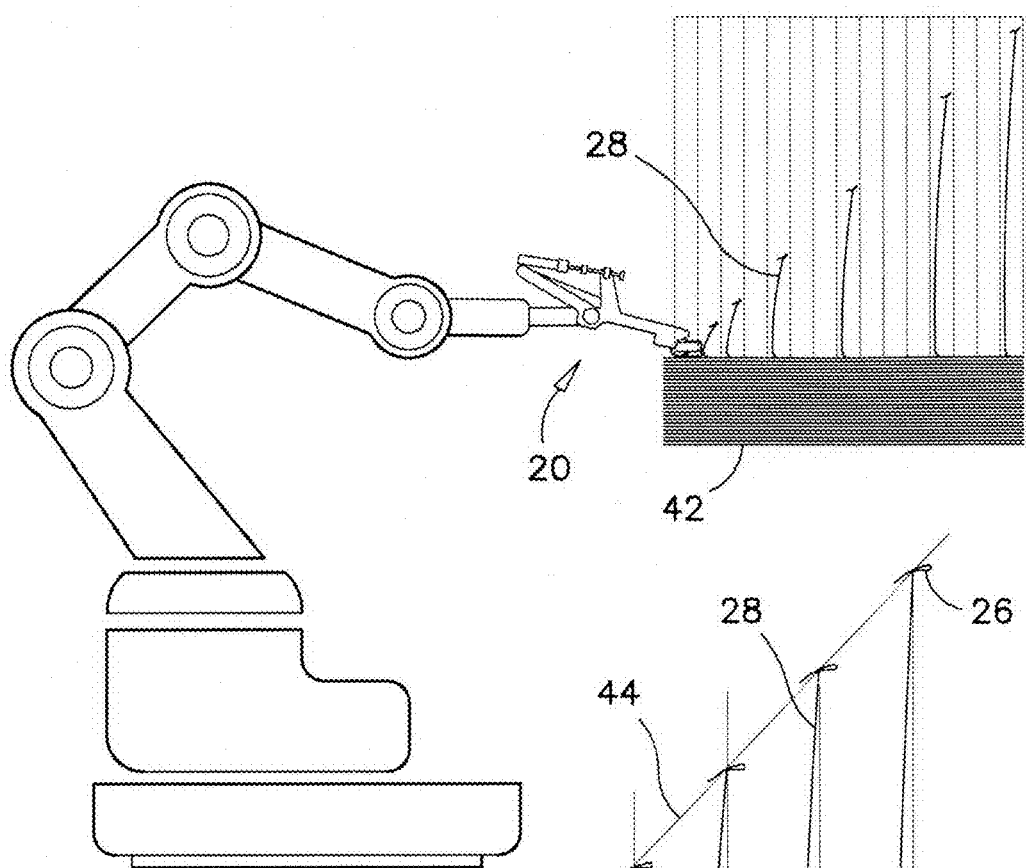
FIG. 3
PRIOR ART
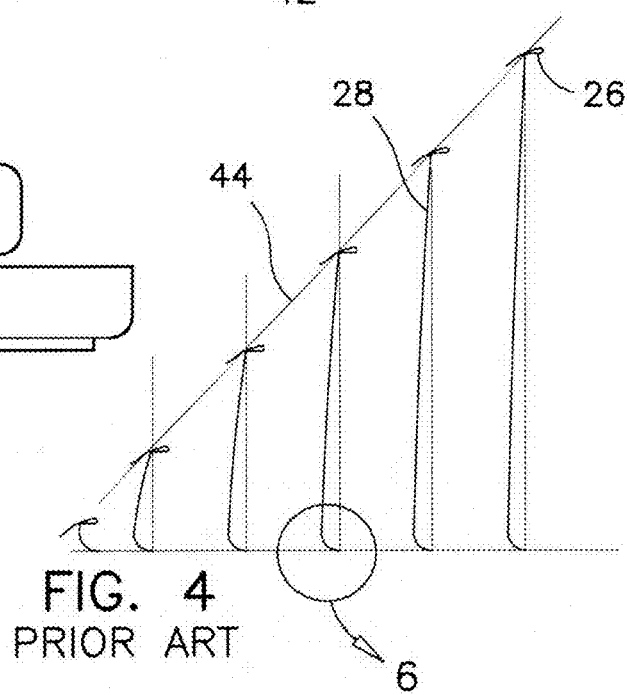
FIG. 4
PRIOR ART
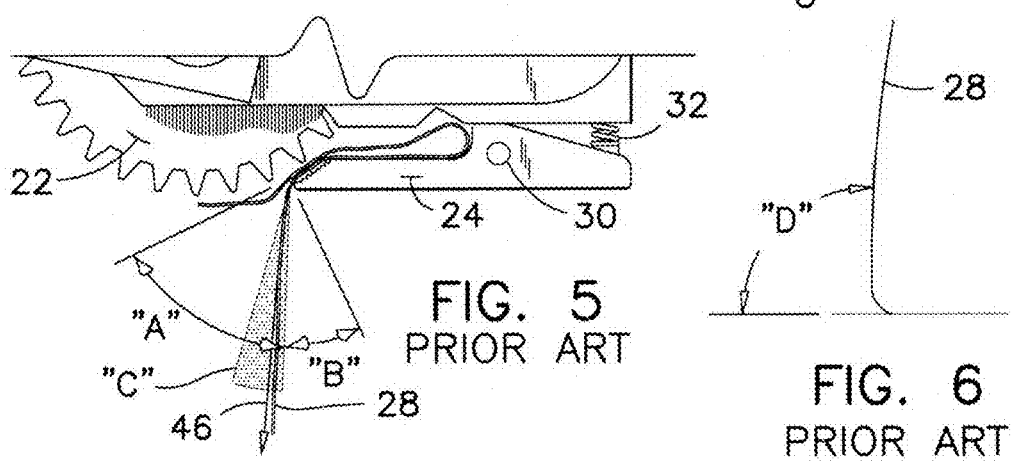
FIG. 5
PRIOR ART
FIG. 6
PRIOR ART

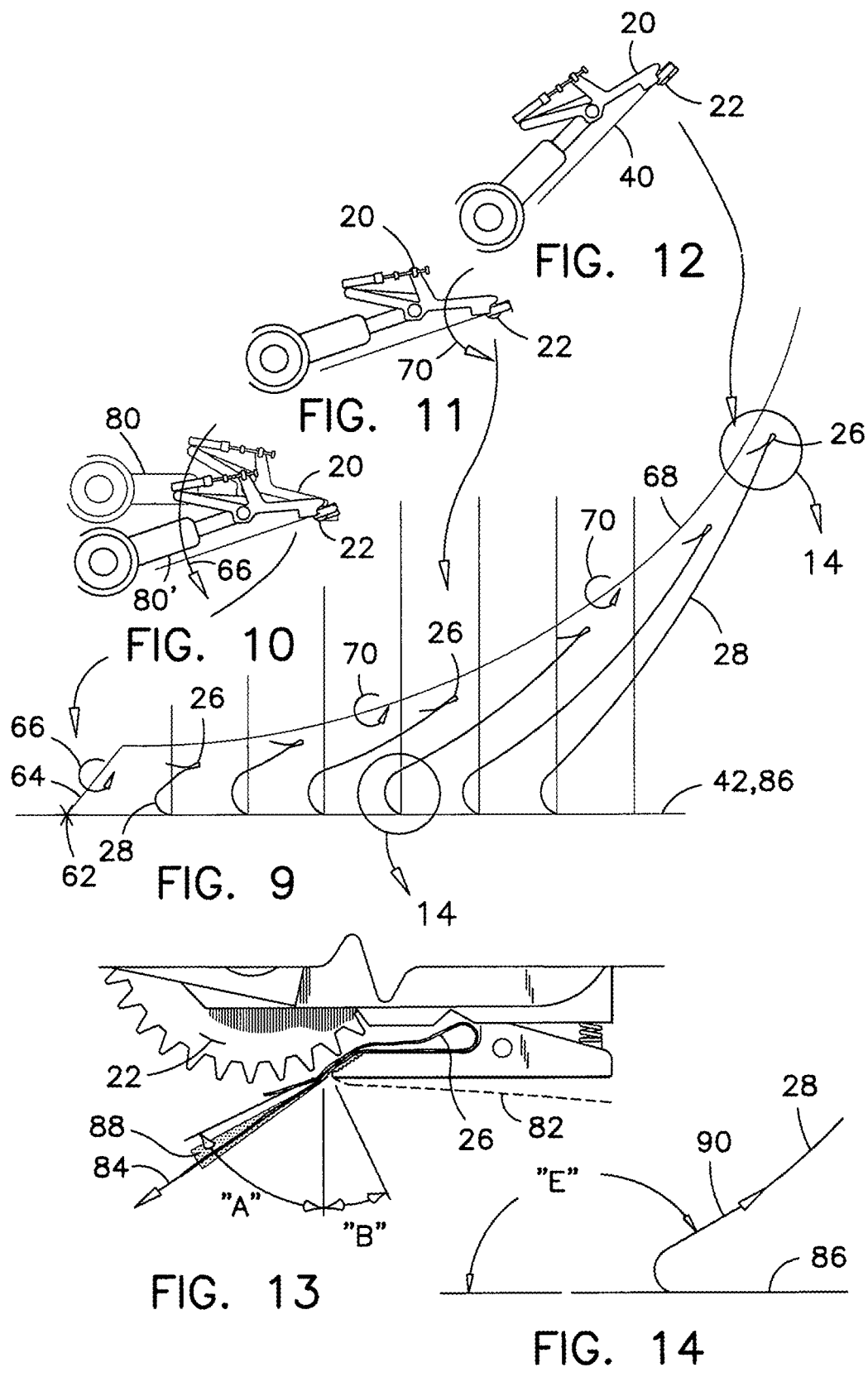

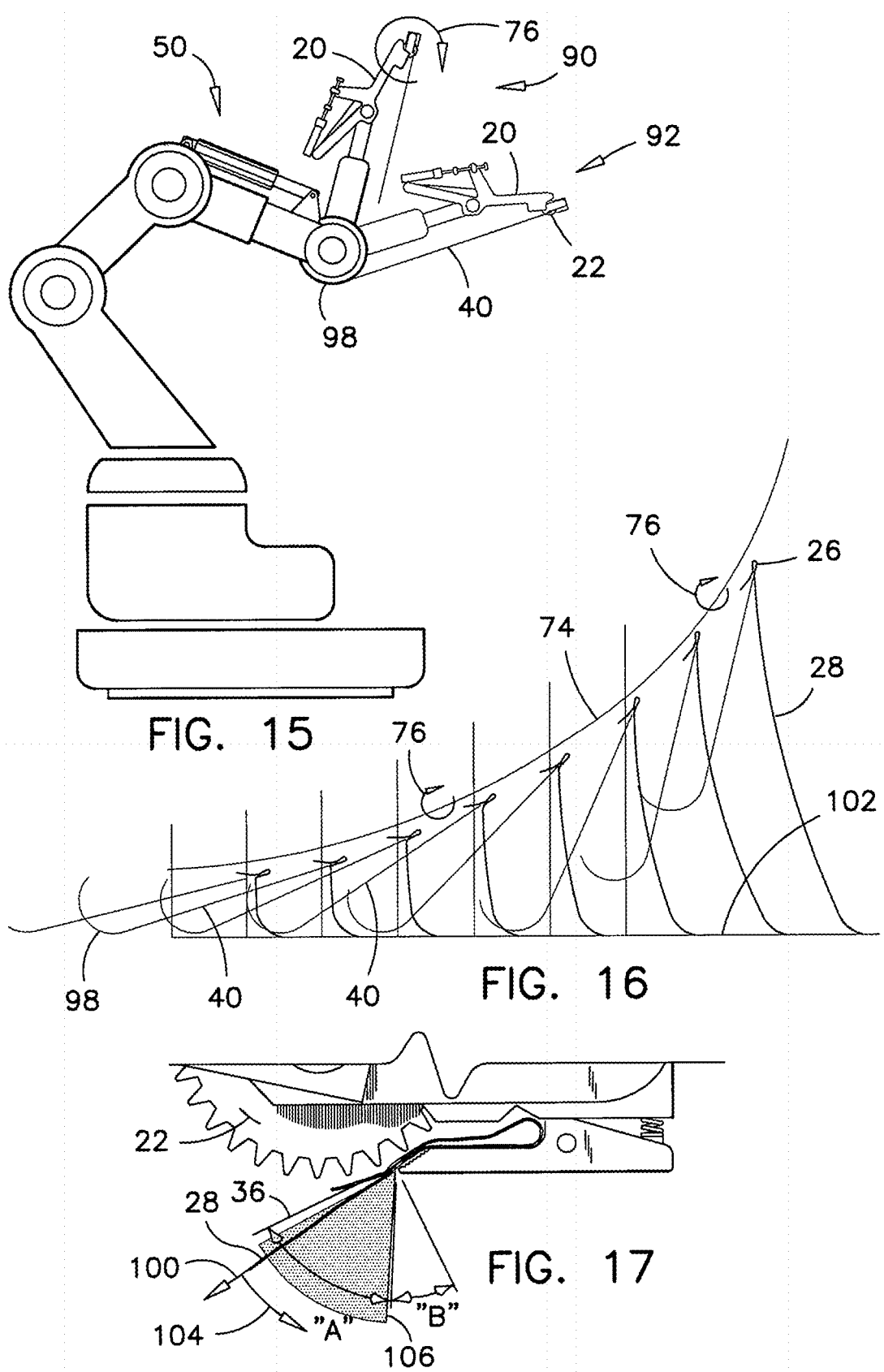

ROBOTIC MANIPULATION OF FABRIC PIECES USING A DROPPING-ROLLER-TYPE PICKER

FIELD OF THE INVENTION

This invention pertains to method and apparatus for robotic manipulation of fabric material using a dropping-roller-type fabric picker, and more specifically, it pertains to the manipulation of fabric pieces using a specific dropping-roller fabric picker from the prior art.

BACKGROUND OF THE INVENTION

Dropping-roller-type fabric gripper or picker that is of interest herein is referred to in the industry as the Morton™ picker. This gripper is described in the following documents:
U.S. Pat. No. 3,940,125 issued to K. O. Morton on Feb. 24, 1976;
U.S. Pat. No. 4,019,729 issued to K. O. Morton on Apr. 26, 1977;
U.S. Pat. No. RE. 30,084 issued to K. O. Morton on Aug. 28, 1979;
U.S. Pat. No. 4,157,823 issued to K. O. Morton on Jun. 12, 1979.

The Morton™ picker is considered the best fabric picker ever invented. It is efficient on a variety of fabric materials. It is reliable and of low maintenance. It is easy to use and it is adaptable to various manipulators and sewing operations. For convenience, the Morton™ picker is referred to hereinafter as the "preferred fabric picker", or the Morton™ picker.

However, it is believed that the preferred fabric picker has not been used to a great extent in robotic applications. It is believed that robotic manipulations of fabric pieces using a preferred fabric picker apply strains on the picker, of which users of the preferred fabric picker have not been able to understand and overcome.

For reference purposes, the following documents represent a good inventory of dropping-roller-type fabric grippers other than the preferred fabric picker, and their methods of uses.
U.S. Pat. No. 3,253,824 issued to W. F. Southwell et al., on May 31, 1966;
U.S. Pat. No. 3,353,821 issued to R. E. Smith et al., on Nov. 21, 1967;
U.S. Pat. No. 3,442,505 issued to C. Szentkuti on May 6, 1969;
U.S. Pat. No. 3,583,695 issued to R. H. Sherwood on Jun. 8, 1971;
U.S. Pat. No. 4,157,825 issued to B. Ellenberger et al., on Jun. 12, 1979;
U.S. Pat. No. 4,176,832 issued to F. H. Hughes et al., on Dec. 4, 1979;
U.S. Pat. No. 4,198,041 issued to F. H. Hughes et al., on Apr. 15, 1980;
U.S. Pat. No. 4,482,144 issued to K. B. Glassby on Nov. 13, 1984;
U.S. Pat. No. 5,082,267 issued to C. H. Sandborn III on Jan. 21, 1992;
U.S. Pat. No. 5,174,558 issued to C. H. Sanborn III on Dec. 29, 1992;
U.S. Pat. No. 5,180,155 issued to T. Asai on Jan. 19, 1993;
U.S. Pat. No. 5,324,016 issued to R. J. Beasock et al., on Jun. 28, 1994.

Robotic devices designed for handling fabric materials and the type of fabric pickers used with these devices are described in the following documents:
U.S. Pat. No. 3,547,432 issued to D. F. Herbeg et al., on Dec. 15, 1970;
U.S. Pat. No. 4,299,179 issued to B. Helffer et al., on Nov. 10, 1981;
U.S. Pat. No. 4,425,858 issued to F. B. Hargett on Jan. 17, 1984;
U.S. Pat. No. 5,040,778 issued to W. R. Cole Jr. On Aug. 20, 1991;
U.S. Pat. No. 5,303,910 issued to B. N. McGill et al., on Apr. 19, 1994;
U.S. Pat. No. 5,535,997 issued to G. F. Croyle et al., on Jul. 16, 1996;
U.S. Pat. No. 5,540,424 issued to C. Trigg et al., on Jul. 30, 1996;
U.S. Pat. No. 5,806,845 issued to D. Burt et al., on Sep. 15, 1998;
U.S. Pat. No. 8,060,998 issued to Y. Rey et al., on Nov. 22, 2011;
U.S. Pat. No. 8,868,231 issued to K. P. Moore et al., on Oct. 21, 2014;
US Publication 2014/0052297 by T. Mattern et al., on Feb. 20, 2014;
US Publication 2015/0098787 by F. M. Ou et al., on Apr. 9, 2015.

Robotic manipulations of fabric pieces are often associated with large movements in three dimensions. In the past, the preferred fabric picker has been left out from these applications with large movements. Reference is now made to FIGS. 1-6 in the drawings to provide some reasons, as best understood, why the preferred fabric picker has not been used extensively in robotic applications with large movements.

The preferred fabric picker is illustrated in FIGS. 1 and 2. This picker 20 has a gripping wheel 22 and a pressing foot 24. In use, the pressing foot 24 is brought to rest on a pile of fabric material (not shown). The toothed wheel 22 rotates counterclockwise to pinch and to accumulate a portion of the piece 26 of fabric in a gap between the toothed wheel 22 and the pressing foot 24. During this grabbing motion, the remainder 28 of the piece of fabric material to be lifted, below the bunched portion 26 lays flat under the pressing foot 24 as can be seen in FIG. 2. The bunched portion 26 shown in FIG. 2 is referred to hereinafter as the grab 26.

The pressing foot 24 is pivoted on axis 30 and is pressed toward the toothed wheel 22 by an adjustable spring 32. The compression of the spring 32 is adjusted for different types of fabric, different thicknesses and weights. This adjustment is a very fine adjustment and must be balanced between easy grabbing, a good retention and an easy releasing of the fabric.

As can be understood, upon lifting of the piece of fabric material, that piece to be lifted 28 folds and hangs down into a vertical position, and applies a force vector 34 on the tip of the pressing foot 24.

After much testing of the preferred fabric picker, it has been found that this picker has a region of strong retention labeled as "A" in FIG. 2, and a region of weak retention, labeled as "B". It will be appreciated that any weight-of-the-piece vector 34, herein after referred to as the weight vector, in the region "B" apply as strong moment about the pivot pin 30 and against the spring 32 to reduce the retention between the pressing foot 24 and the toothed wheel 22. The region of strong retention "A" has been found to be defined by a region starting from a tangent 36 to the toothed wheel 22 and ends with a perpendicular or right angle 38 to the bottom surface of the pressing foot 24.

For reference purposes, the axis 40 of the preferred fabric picker 20 is defined and illustrated as a line passing through the axis of the toothed wheel 22, parallel with the lower surface of the pressing foot 24, as shown in FIG. 1.

Referring now to FIGS. 3-6, a typical robotic manipulation of a piece of fabric material is explained. A piece of fabric material 28 is picked up from a pile 42 of such pieces. The path 44 followed by the picker 20 is generally a straight line corresponding to the peeling off of the piece 28 from the pile 42. In this typical example, the piece of fabric material 28 hangs almost vertically down with its weight vector 46 overlapping the region "C", astride the region of strong retention "A" and the region of weak retention "B". It will be appreciated that any force vector 46 applied along the region "C" provides a maximum moment of the pressing foot 24 about axis 30, and a loosening of the grip on the fabric. This illustrated example may explain one reason why the preferred fabric picker has not been used extensively in robotic applications with large movements. Nevertheless, this picker is still the preferred picker for reliably separating a piece of fabric material from a pile of such pieces of fabric material.

Moreover, the pulling of a piece of fabric material from a pile along a straight path 44 is associated with a peeling angle "D" which is near a right angle. Such angle is not ideal for breaking peeling adhesion forces between the layers. These peeling stresses add to the moment applied to the pressing foot 24, further reducing the picker's grip on the fabric.

Although the preferred fabric picker has been left out of robotic manipulations, it is believed that there is a need in the garment industry to understand the operations and characteristics of the preferred fabric picker and to develop methods of use for this picker so that the industry can continue to benefit from this clever device.

SUMMARY OF THE PRESENT INVENTION

In the present invention, there is provided a method of transporting a piece of fabric material using a Morton™ picker having a toothed wheel; a pressing foot with a pressing surface and a gap between the toothed wheel and the pressing foot. This method comprises the steps of:
  aligning a weight vector of the piece of fabric material being lifted, from the gap and into a region between a tangent to the toothed wheel and a right angle to the pressing surface of the pressing foot; and
  lifting and transporting the piece of fabric material while maintaining the alignment of the weight vector in that region.

In a second aspect of the present invention, there is provided robotic installation comprising a robotic arm and a Morton™ picker mounted to the robotic arm for manipulating pieces of fabric material. The robotic arm is configured for simultaneously rotating an axis of the picker and for moving the picker along a hyperbolic trajectory, in a single complex motion without jitter.

The robotic arm has several degrees of freedom and efficient multi-axes motion translators to ensures that the weight vector of the piece of fabric material being transported remains within the region of strong retention of the Morton™ picker.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of methods of use for a preferred fabric picker according to the present invention are described with the aid of the accompanying drawings, in which like numerals denote like parts throughout the several views.

FIG. 3 represents a robotic application using the preferred fabric picker where the preferred fabric picker is operated in a conventional manner;

FIG. 4 illustrates a path used by the picker when used in the conventional manner as seen in FIG. 3;

FIG. 5 illustrates an enlarged view of the picking head of the preferred fabric picker, and a region of stress on the picking head when the picker is used in the conventional manner as illustrated in FIGS. 3 and 4;

FIG. 6 is an enlarged portion of a piece of fabric material under peeling stresses, as seen in detail circle 6 in FIG. 4;

FIG. 9 illustrates the preferred path for lifting a piece of fabric material as illustrated in FIG. 8;

FIGS. 10, 11 and 12 illustrate preferred fabric picker alignments and a preferred orientations of a grab in the preferred fabric picker during the preferred path for lifting;

FIG. 13 illustrates the weight vectors on the picking head during the preferred path for lifting;

FIG. 14 illustrates a preferred peeling angle maintained during the preferred path for lifting;

FIG. 15 illustrates the preferred robotic machine and the preferred range of movement of the preferred fabric picker during a laying down cycle;

FIG. 16 illustrates a preferred path to be followed for laying a piece of fabric material face down using a preferred fabric picker;

FIG. 17 illustrates the resultant force vectors applied to the picking head during the laying down cycle illustrated in FIG. 16.

DESCRIPTION OF THE PREFERRED EMBODIMENT

The drawings presented herein are presented for convenience to explain the functions of all the elements included in the preferred embodiment of the present invention. Elements and details that are obvious to the person skilled in the art may not have been illustrated. Conceptual sketches have been used to illustrate elements that would be readily understood in the light of the present disclosure. These drawings are not fabrication drawings, and should not be scaled.

Figure 1:
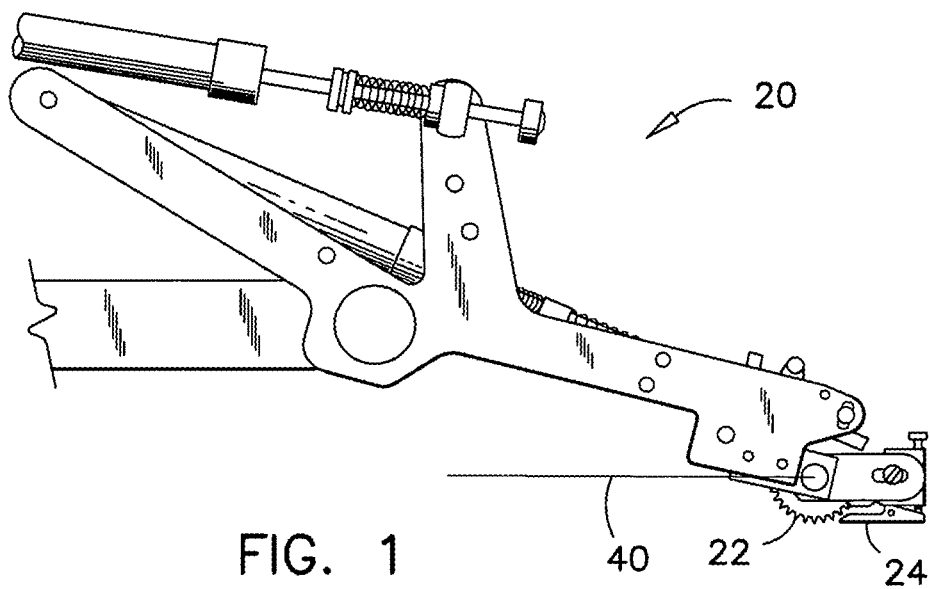
FIG. 1 is a side view of a preferred fabric picker.
Figure 2:
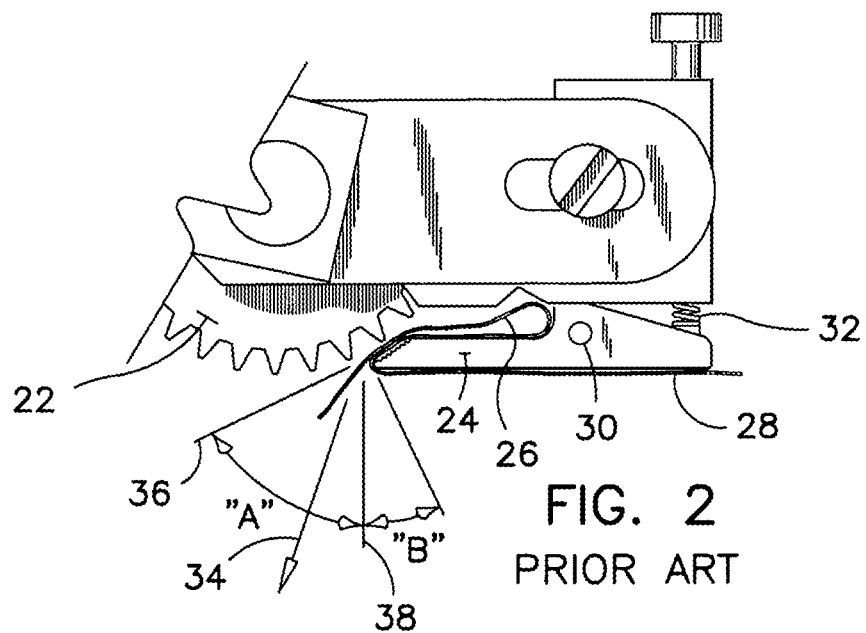
FIG. 2 is an enlarge portion of the picking head of the picker illustrated in FIG. 1.
Figure 7:
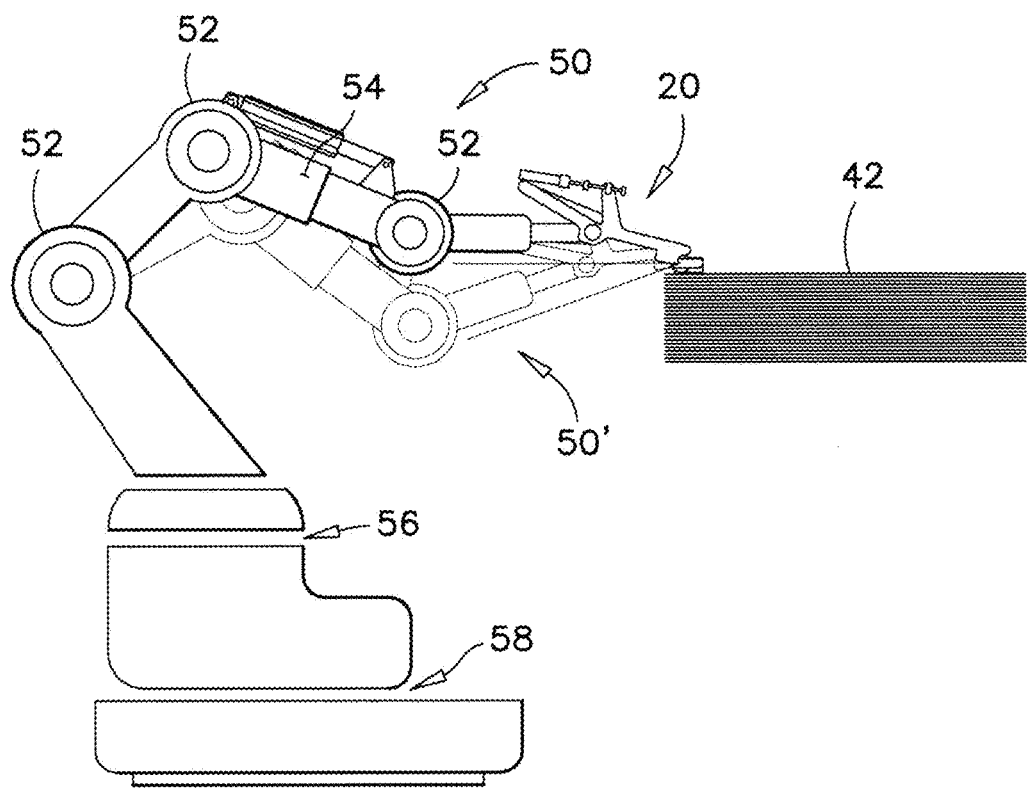
FIG. 7 is a side view of a preferred robotic machine using a preferred fabric picker on a pile of fabric pieces.

The preferred fabric picker 20 has been used successfully in robotic applications, provided that some conditions are respected. The first condition to obtain a successful operation of the preferred fabric picker 20 is that the robotic arm 50 supporting it has a sufficient number of degrees of freedom to be able to raise the preferred fabric picker 20 while effecting a rotation of the preferred fabric picker 20 about the axis of the toothed wheel 22, as illustrated in FIG. 7. In the preferred robotic arm 50, the machine has; three axes of rotation 52 and an extendible segment 54 in a first vertical plane. The machine also has an axis of rotation 56 in a first horizontal plane and a linear slide 58 in a second horizontal plane below the first one. The machine has efficient and fine-indexing motion translators to move the preferred fabric picker smoothly.

Another condition to be respected to obtain successful operation of the preferred picker 20 is that space must be provided next to the pile 42 of pieces of fabric material for the robotic arm 50 to rotate to a low position 50' during the initiation of a transport of a piece of fabric material material. The low position 50' mentioned here is a position that is lower than the top of the pile 42 of fabric pieces.

Figure 8:
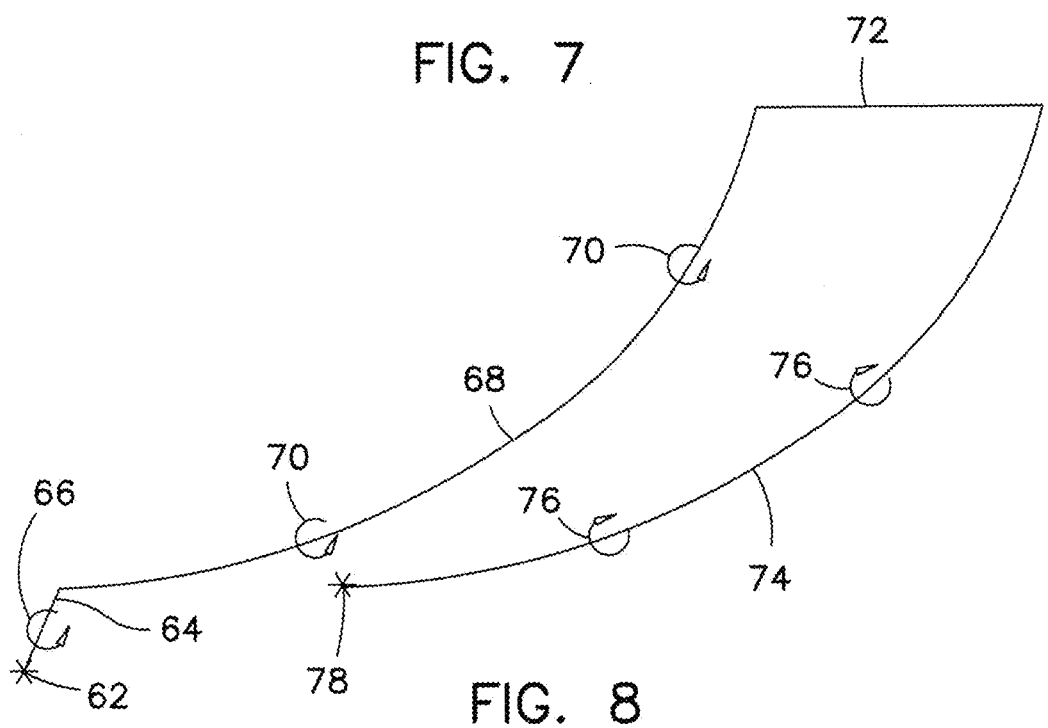
FIG. 8 illustrates preferred paths for lifting a piece of fabric material face up from a pile of such material, and for laying that piece face down upon a horizontal surface.

Referring now to FIG. 8, other conditions to be respected to obtain a successful operation of the preferred picker 20 is that the raising of a piece of fabric material from a first location and the laying down of that piece to a second location should be done along hyperbolic motions as illustrated.

During the picking up of a piece of fabric material as illustrated in FIG. 8, the preferred fabric picker 20 grabs the fabric at point 62. The toothed wheel 22 is raised along an incline 64 while rotating the axis of the preferred fabric picker 20 about the toothed wheel 22 counterclockwise from horizontal alignment as illustrated by arrow 66. Then the piece of fabric material is raised the full length of the piece while the axis of the toothed wheel 22 of the preferred fabric picker 20 follows a first hyperbolic curve 68 as illustrated. During this hyperbolic motion, the preferred picker 20 is gradually rotated conterclockwise about the axis of the toothed wheel 22, as illustrated by arrows 70. The degree of rotation of the preferred fabric picker 20 and the characteristics of the first curve 68 will be explained later.

Segment 72 represents a transportation of the fabric piece from a first location to a second location in a garment manufacturing plant.

The laying down of the fabric piece mentioned above is preferably done along a second hyperbolic curve 74 similar to the first hyperbolic curve 68. During the descent of the preferred fabric picker 20 along curve 74, the alignment of the preferred fabric picker 20 is gradually rotated in a clockwise direction about the axis of the toothed wheel 22, as indicated by arrow 76. The piece of fabric material is released in a normal manner at the lower end 78 of the curve 74.

The robotic arm 50 is preferably configured for complex motion, in that the rotation of the axis 40 of the preferred fabric picker about the toothed wheel 22, clockwise or counterclockwise, is respectively combined to the first or second hyperbolic trajectories, and carried out simultaneously with gentle acceleration and smooth motion.

Referring now to FIGS. 9-14, the raising of a piece of fabric material will be explained in greater details. The example illustrated explains the principle of a method of determining the proper path for lifting a piece of fabric material with the preferred fabric picker 20. It will be appreciated that many variations to this method can be developed from this example, to suit different fabric material, thickness and different size.

FIG. 9 illustrates various positions of a piece of fabric material 28 being separated from a pile of such pieces of fabric material. During this separating motion the toothed wheel 22 of the preferred fabric picker 20 follows the hyperbolic curve 68, while the preferred fabric picker 20 is being rotated in a counterclockwise direction 70 about the axis of the toothed wheel 22.

In FIG. 10, the upper position 80 of the preferred picker 20 is the position at which a grab 26 is formed and a separating motion is about to start. During the initial straight segment 64 from the picking motion at point 62, the preferred fabric picker 20 is immediately rotated counterclockwise to a position such as shown as 80' with more or less inclination. The purpose of such rotation is to move the fabric segment 28 of the piece of fabric material from the grabbing position 82 to a lifting position, and to adjust the weight vector 84 anywhere within a region of strong retention "A" of the preferred fabric picker 20, as illustrated in FIG. 13.

After this orientation is completed, the preferred fabric picker 20 is moved such that the toothed wheel 22 follows the hyperbolic curve 68 until the piece of fabric material 28 is free from the top of the pile 42. During this hyperbolic motion, the preferred fabric picker 20 is rotated about the axis of the toothed wheel 22 in a counterclockwise direction 70 as shown in FIGS. 11 and 12, in order to maintain the piece of fabric material 28 in a lifting position and the corresponding weight vector 84, within the region of strong retention "A" of the preferred picker 20. In the example illustrated herein, it is believed that, with all proportions respected, it is possible to maintain the weight vector 84 within a narrow region 88 as shown in FIG. 13.

An important advantage with the lifting segment 64; the rotation motions 66 and 70, and the hyperbolic displacement 68, is that a peeling of the piece of fabric material 28 from the top surface 86 of the pile 42 is effected at an ideal angle "E" of between 130° to 160°, as shown in FIG. 14, in which the peeling force 90 with most fabric materials is greatly reduced.

A preferred method for laying down the piece of fabric material 28 is illustrated in FIGS. 15-17.

In this example, the initial position 90 of the preferred fabric picker 20 is shown in FIG. 15. The ending position is indicated by label 92. The clockwise rotation between the two positions is shown by label 76. In this drawing, line 40 represents the alignment of the preferred fabric picker 20 and the arc 98 represents the elbow of the robotic arm 50.

As was explained before, the laying down movement of the toothed wheel 22 follows the hyperbolic curve 74, while the preferred fabric picker 20 is rotated about the toothed wheel 22 in a clockwise direction 76. In this example, the degree of adjustment of the weight vector 100 is somewhat limited by the clearance of the elbow 98 of the robotic arm 50 above the surface of the table 102 on which the piece of fabric material 28 is laid, as may be appreciated from the illustration in FIG. 16. It will also be appreciated that the orientation of the weight vector 100 of the piece of fabric material 28, moves in a direction 104 as the weight vector 100 diminishes to zero near the boundary of strong retention "A", when the grab is released. The magnitude of the weight vector 100 is maximum near a tangent 36 to the toothed wheel 22 where retention is stronger. The movement of the weight vector 100 toward the region 106 of lesser retention advantageously corresponds to a weight vector of lesser value.

Using the experiments disclosed herein above, users of the preferred fabric picker 20 can develop, by extrapolation, experimentation and deduction, movements and curves that are compatible to the characteristics of this preferred fabric picker 20. Using the information provided herein, it is believed that the preferred fabric picker 20 can be used advantageously in many applications and provide better results than any other fabric picker in this field.

While one embodiment of the present invention has been illustrated in the accompanying drawings and described herein above, it will be appreciated by those skilled in the art that various modifications, alternate constructions and equivalents may be employed. Therefore, the above description and illustrations should not be construed as limiting the scope of the invention, which is defined in the appended claims.

What is claimed is:

1. A method of transporting a piece of fabric material using a dropping-roller-type picker having a toothed wheel; a pressing foot with a pressing surface and a gap between said toothed wheel and said pressing foot, wherein said toothed wheel being configured to retain a piece of fabric material thereunder, in said gap and against said pressing foot; comprising the steps of:
aligning said picker for maintaining an alignment of a weight vector of said piece of fabric material from said gap, into a region between a tangent to said toothed wheel and a perpendicular to said pressing surface;
lifting said piece of fabric material while maintaining said alignment of said weight vector in said region, and during said step of lifting, rotating an axis of said picker about said toothed wheel, wherein said axis is a line passing through a center of said toothed wheel and extending parallel to said pressing surface; and lifting said piece of fabric material along a hyperbolic lifting trajectory while maintaining said step of rotating; wherein said step of rotating and said step of lifting being combined in a first single complex motion; and
further comprising a step of moving said piece of fabric material from a pile of said pieces of fabric material to a work table, wherein said step of moving comprising the step of lifting said piece of fabric material face up, and lowering said piece of fabric material face down on said work table while maintaining said alignment of said weight vector and while rotating said axis of said picker.

2. The method of transporting a piece of fabric material as claimed in claim 1, wherein said step of rotating comprises the step of rotating said axis of said picker counterclockwise about said toothed wheel.

3. The method of transporting a piece of fabric material as claimed in claim 2, wherein said step of lifting comprises lifting said piece of fabric material along an inclined path and then along said hyperbolic lifting trajectory while maintaining said step of rotating.

4. The method of transporting a piece of fabric material as claimed in claim 1, further comprising lifting said piece of fabric material from said pile of said pieces of fabric material, and peeling said piece of fabric material from said pile using a peeling angle of between 130° to 160°.

5. The method of transporting a piece of fabric material as claimed in claim 1, wherein said step of lowering said piece of fabric material is effected while moving said picker along a hyperbolic laying trajectory.

6. The method as claimed in claim 5, wherein said step of rotating and said step of lowering are combined in a second single complex motion.

7. The method as claimed in claim 6, wherein said picker is mounted to a robotic arm and said first and second single complex motions are effected by said robotic arm.

8. The method as claimed in claim 7, wherein said first and second complex motions are effected without jitter.

9. The method as claimed in claim 7, wherein said first single complex motion comprises the step of rotating said axis of said picker counterclockwise from a horizontal alignment toward a vertical alignment, and said second complex motion comprises the step of rotating said axis of said picker clockwise from an inclined alignment toward said horizontal alignment.

10. A robotic installation for manipulating pieces of fabric material, comprising a robotic arm and a dropping-roller-type picker mounted to said robotic arm; said picker having a toothed wheel; a pressing foot with a pressing surface and a gap between said toothed wheel and said pressing foot, wherein said toothed wheel being configured to retain a piece of fabric material thereunder, in said gap and against said pressing foot; said robotic arm being configured to simultaneously rotate an axis of said picker and to move said picker along a hyperbolic trajectory; and said robotic aim being also configured to lift a piece of fabric material; to align said picker for maintaining an alignment of a weight vector of said piece of fabric material from said gap, to a region between a tangent to said toothed wheel and a perpendicular to said pressing surface; and to maintain said alignment while moving said piece of fabric material, and said robotic aim being further configured to peel said piece of fabric material from a pile of said pieces of fabric material using a peeling angle of between 130° to 160°; and said robotic arm being also configured for lifting said piece of fabric material face up along a first hyperbolic lifting trajectory while rotating said axis of said picker counterclockwise about said toothed wheel; for moving said piece of fabric material to a work table and for lowering said piece of fabric material face down on said work table while rotating said axis of said picker clockwise and moving said picker along a second hyperbolic laying trajectory.

11. The robotic installation as claimed in claim 10, wherein said robotic arm being configured for combining said step of rotating said axis of said picker counterclockwise and said first hyperbolic lifting trajectory into a first single complex motion; and for combining said step of rotating said axis of said picker clockwise and said second hyperbolic laying trajectory into a second single complex motion.

12. The robotic installation as claimed in claim 11, wherein said first single complex motion comprises the step of rotating said axis of said picker from a horizontal alignment toward a vertical alignment; and said second complex motion comprises the step of rotating said axis of said picker from an inclined alignment toward said horizontal alignment.

13. The robotic installation as claimed in claim 12, wherein robotic arm being configured for effecting said first and second single complex motions along a plane of said robotic arm.

* * * * *